United States Patent
Jang

(10) Patent No.: US 8,391,434 B2
(45) Date of Patent: Mar. 5, 2013

(54) RECEIVER FOR CLOCK RECONSTITUTION

(75) Inventor: Dae-Joong Jang, Anyang-si (KR)

(73) Assignee: Dongbu HiTek Co., Ltd., Gyeonggi-do (KR)

( * ) Notice: Subject to any disclaimer, the term of this patent is extended or adjusted under 35 U.S.C. 154(b) by 567 days.

(21) Appl. No.: 12/647,498

(22) Filed: Dec. 27, 2009

(65) Prior Publication Data

US 2010/0166128 A1 Jul. 1, 2010

(30) Foreign Application Priority Data

Dec. 30, 2008 (KR) .................. 10-2008-0137606

(51) Int. Cl.
*H04L 7/00* (2006.01)
*H04L 27/06* (2006.01)

(52) U.S. Cl. ..................................... 375/355; 375/340

(58) Field of Classification Search .................. 375/316, 375/295, 219, 222, 340, 354, 355, 256, 257
See application file for complete search history.

(56) References Cited

U.S. PATENT DOCUMENTS

| | | | | |
|---|---|---|---|---|
| 6,147,963 A * | 11/2000 | Walker et al. | ................. | 370/200 |
| 6,614,296 B2 * | 9/2003 | Casper | ............... | 330/9 |
| 7,020,208 B1 * | 3/2006 | Yen | ............... | 375/244 |
| 7,450,535 B2 * | 11/2008 | Best | ............... | 370/314 |
| 8,156,365 B2 * | 4/2012 | Jang | ............... | 713/500 |
| 2003/0016091 A1 * | 1/2003 | Casper | ............... | 333/18 |
| 2004/0148482 A1 * | 7/2004 | Grundy et al. | ............... | 711/167 |
| 2004/0246987 A1 * | 12/2004 | Webb et al. | ............... | 370/463 |
| 2006/0067391 A1 * | 3/2006 | Garlepp | ............... | 375/224 |
| 2006/0164264 A1 * | 7/2006 | Dally et al. | ............... | 341/50 |
| 2007/0127404 A1 * | 6/2007 | Best | ............... | 370/314 |
| 2010/0272215 A1 * | 10/2010 | Lin et al. | ............... | 375/316 |

* cited by examiner

*Primary Examiner* — Tesfaldet Bocure
(74) *Attorney, Agent, or Firm* — Sherr & Jiang, PLLC

(57) ABSTRACT

A receiver for clock reconstitution in a semiconductor field includes a termination resistor arranged between two input stages, to which a pair of input signals are input, the termination resistor including a first resistor and a second resistor; a strobe signal generator for generating a strobe signal, using a first signal corresponding to a differential voltage output from a node between the first resistor and the second resistor; and a clock reconstitutor for generating a clock signal in response to the strobe signal generated from the strobe signal generator.

20 Claims, 4 Drawing Sheets

RECEIVER FOR CLOCK RECONSTITUTION

The present application claims priority under 35 U.S.C. 119 to Korean Patent Application No. 10-2008-0137606 (filed on Dec. 30, 2008), which is hereby incorporated by reference in its entirety.

BACKGROUND

Generally, a reduced swing differential signaling (RSDS) system or a mini low voltage differential signaling (mini-LVDS) system is used for an interface between a timing controller and a source driver. However, such a system has a drawback in that it is necessary to use a large number of signal lines and it is difficult to achieve high-frequency operation. An advanced intra Panel interface (AIPI) has been proposed for a transmission system capable of reducing the number of signal lines while achieving high-frequency operation.

FIG. 1 is a waveform diagram illustrating a signal transmission type of an AIPI. FIG. 2 is a circuit diagram illustrating a receiver stage of the AIPI; however, this system has a number of drawbacks. In accordance with the concept of generating a clock signal in this system, a pair of input signals IN and INB are compared with a pair of reference signals REFH and REFL, respectively, in order to detect a state in which the paired input signals IN and INB have levels beyond the levels of the paired reference signals REFH and REFL in a clock period, respectively. However, when the reference signals REFH and REFL are severely varied due to variations in process, supply voltage, temperature, etc. and in particular, when the signal levels of the paired input signals IN and INB are severely varied, it is difficult to discriminate a clock level and a data level. In this case, a clock clk may not be generated in the clock period. Erroneously, a clock clk may be generated in a data period. No clock may be generated in any period. Also, a transition time difference may occur due to a level difference between clock and data signals, so that the clock and data reconstituted in the receiver may be desynchronized, and the timing margin of the data latching operation may be limited.

SUMMARY

Embodiments relate an advanced intra Panel interface (AIPI), namely, a difficulty in clock reconstitution caused by a severe variation in the difference between the level of a reference signal and the level of an input signal is addressed. Embodiments relate to a receiver for clock reconstitution capable of securely reconstituting a clock signal by changing the position of a clock signal in a serial signal stream, different from the AIPI.

Embodiments relate to a receiver for clock reconstitution that includes a termination resistor arranged between two input stages, to which a pair of input signals are input, the termination resistor including a first resistor and a second resistor, a strobe signal generator for generating a strobe signal, using a first signal corresponding to a differential voltage output from a node between the first resistor and the second resistor, and a clock reconstitutor for generating a clock in response to the strobe signal generated from the strobe signal generator.

The strobe signal generator may include a low-frequency filter for filtering the first signal, thereby outputting a second signal having a lower voltage level than the first signal, and a fast-transition detector for receiving the first signal and the second signal, thereby generating the strobe signal. The fast-transition detector may generate the strobe signal when a voltage difference is generated between the first signal and the second signal as the first signal is varied at a fast transition rate. The fast-transition detector may not generate the strobe signal when no voltage difference is generated between the first signal and the second signal as the first signal is varied at a slow transition rate.

DRAWINGS

DESCRIPTION

Hereinafter, a receiver for clock reconstitution according to embodiments will be described with reference to the accompanying drawings.

Figure 1:
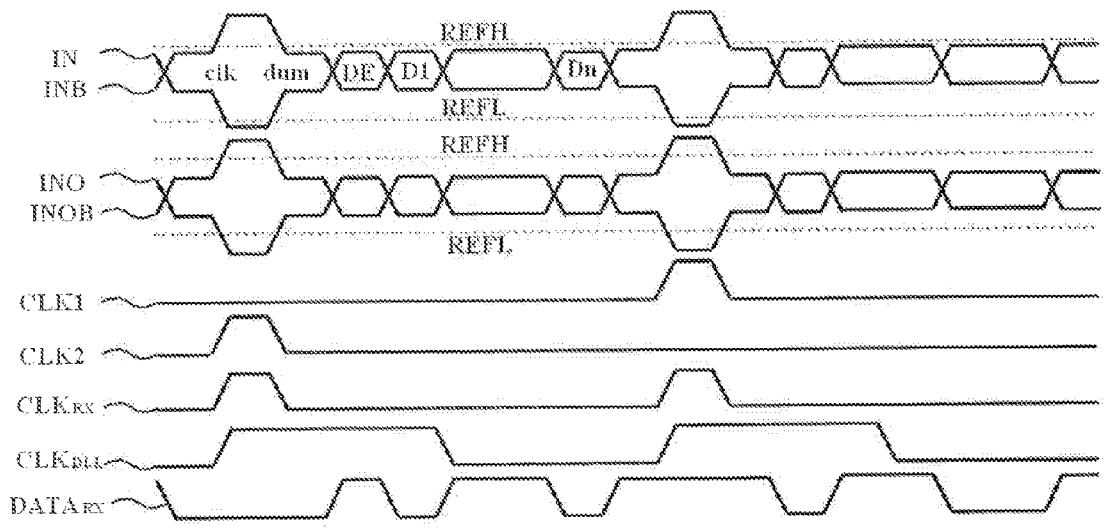
FIG. 1 is a waveform diagram illustrating a signal transmission type of an advanced intra Panel interface (AIPI).
Figure 2:
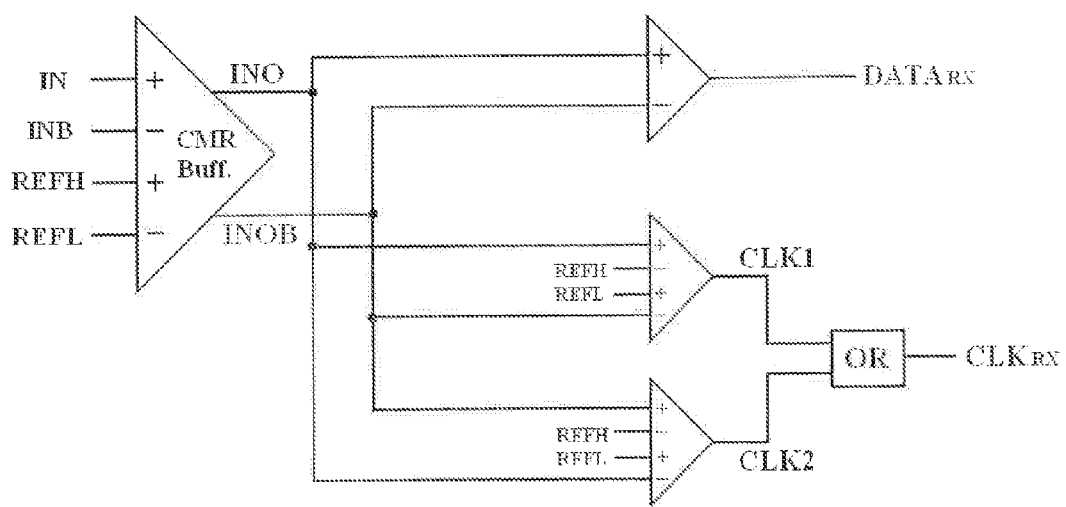
FIG. 2 is a circuit diagram illustrating a receiver stage of the AIPI.
Figure 3:
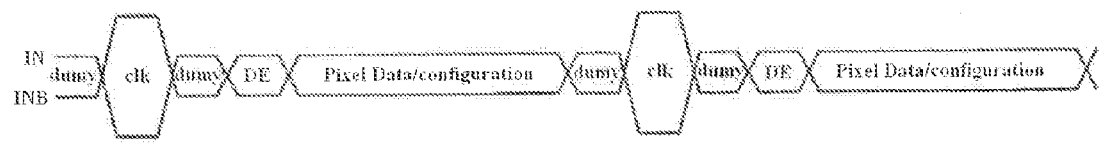
FIG. 3 is a waveform diagram illustrating a signal transmission type of a related AIPI.

FIG. 3 is a waveform diagram illustrating a signal transmission type of a related AIPI.

FIGS. 4A to 4D are waveform diagrams illustrating signal transmission types of an advanced clock-embedded interface (ACEI) according to embodiments.

Referring to the signal timing used in the signal transmission types of the ACEI according to embodiments, as shown in FIGS. 4A to 4D, a dummy signal dummy, a strobe signal STB, a dummy signal dummy, a clock signal clk, and data (for example, pixel data/configuration) are repeated. In other words, the dummy signal, strobe signal, dummy signal, clock signal, and data signal are sequentially transmitted, for the signal transmission interface between a timing controller and a source driver.

The signal transmission type, in accordance with embodiments, is different from related signal transmission types in that the strobe signal STB is arranged at a position corresponding to a clock signal position in the related signal transmission type, and the clock signal clk is arranged just downstream from a dummy signal. The strobe signal STB may be referred to as a hint signal suggesting that a clock signal will appear after a certain time. By virtue of the strobe signal STB, it is unnecessary to use a reference signal for detecting clock timing, which is used in related signal transmission types.

The transition time of the strobe signal STB can vary and still provide an indication that a clock signal clk is positioned just downstream from the strobe signal STB. The clock signal clk may have the same level as a data signal (for example, pixel data/configuration). Accordingly, the clock signal clk and data signal may have the same transition rate. For this reason, it is rare that the synchronous state of the clock signal clk and data signal would be greatly varied. Thus, a large timing margin is provided when the receiver latches the data signal in response to the clock signal clk.

In accordance with embodiments, paired input signals IN and INB exhibit an abrupt voltage level variation in an upward or downward direction in sync with the timing of the strobe signal STB. The receiver detects such a common voltage level variation, and generates a strobe signal STB, based on the result of the detection. Thus, the receiver acquires information that a clock signal clk will be input following the detection timing of the strobe signal STB. In this case, the voltage level dVcom of the strobe signal STB may be appropriately varied.

Figure 4A:
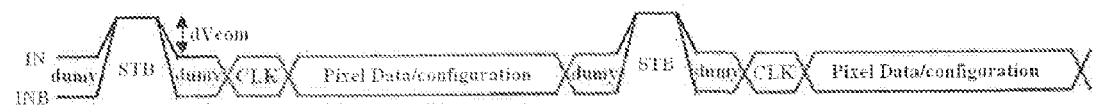
FIGS. 4A to 4D are waveform diagrams illustrating signal transmission types of an advanced clock-embedded interface (ACEI) according to embodiments.
Figure 4B:
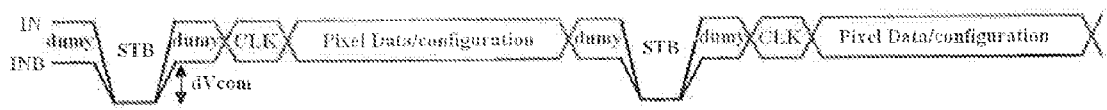
Figure 4C:
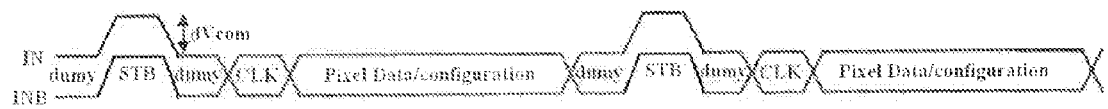
Figure 4D:
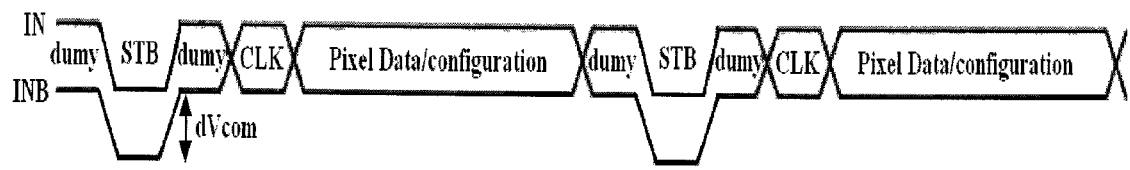

As shown in FIGS. 4B to 4D, the strobe signal STB may be inverted, in order to abruptly vary the common voltage level of the paired input signals IN and INB. The signal transmission type of the ACEI according to embodiments does not require use of a reference voltage, different from the AIPI in which reference signals such as REFH and REFL signals are used. Hereinafter, a clock reconstitution method in the ACEI, which is different from the AIPI, will be described.

Figure 5:
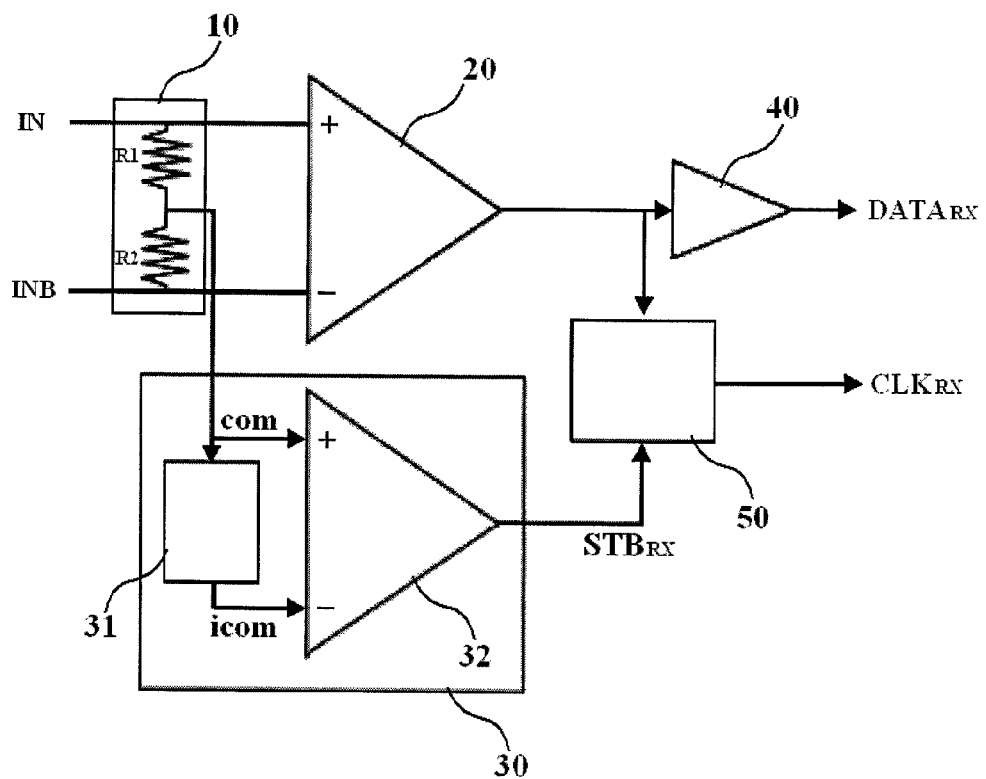
FIG. 5 is a circuit diagram illustrating a receiver of the ACEI signal transmission type according to embodiments.

FIG. 5 is a circuit diagram illustrating a receiver of the ACEI signal transmission type according to embodiments. The receiver includes a comparator 20, a termination resistor 10 arranged between two input terminals of the comparator 20, a strobe signal generator 30 for generating a strobe signal STB, based on a voltage difference output from an intermediate stage of the termination resistor 10, namely, a node between resistors R1 and R2, (namely, a difference between the voltages applied across the resistors R1 and R2), a clock reconstitutor 50 for generating a clock signal clk, and a time synchronizer 40. In particular the strobe signal generator 30 may include a fast-transition detector 32 for generating a strobe signal STB, based on a voltage com corresponding to the voltage difference output between the resistors R1 and R2 (namely, the difference between the voltages applied across the resistors R1 and R2), and a low-frequency filter 31 for filtering the voltage com such that the voltage com has a reference level (for example, about 0V) or a level lower than the level of the voltage com, thereby outputting a voltage icom. The clock reconstitutor 50 generates a clock signal clk in response to the generation of the strobe signal STB from the fast-transition detector 32.

When paired input signals IN and INB are input, and subsequently exhibit an abrupt voltage level variation in an upward or downward direction at the timing of a strobe signal STB following the timing of a dummy signal, the receiver according to embodiments detects the common voltage level variation of the paired input signals IN and INB. When the common voltage level variation is detected, the fast-transition detector 32 included in the receiver detects a strobe signal STB, and outputs the detected strobe signal STB. Then, the clock reconstitutor 50 generates a clock signal $CLK_{RX}$, based on the detected strobe signal STB. As a result, the receiver recognizes the timing with which a clock signal is input.

In accordance with embodiments, the fast-transition detector 32 does not generate a strobe signal when the transition rate of the voltage com corresponding to the difference between the voltages applied across the resistors R1 and R2 in the termination resistor 10 is slow, in other words the transition rate is below a predetermined rate. The fast-transition detector 32 generates a strobe signal when the transition rate of the voltage com is fast, in other words is above a predetermined rate. In this case, the voltage icom, which is input to the fast-transition detector 32, along with the voltage com, is a voltage generated as the voltage com is filtered to have a reference level (for example, about 0V) or a level lower than the level of the voltage com. That is, the voltage icom is an output from the low-frequency filter 31, to which the voltage com is input.

During a data transmission period, the voltage com exhibits a relatively very slow variation. During a clock period, however, the paired input signals IN and INB are simultaneously abruptly varied in an upward or downward direction.

That is, the voltage com exhibits a rapid variation. The method of detecting such a transition rate difference of the voltage com is referred to as differential voltage detection. For this differential voltage detection, namely, detection of an abrupt variation in paired input signals IN and INB, the transmission resistor 10 is arranged between the input stages of the receiver, to which the paired input signals IN and INB are input. Also, the termination resistor 10 is divided into two resistors R1 and R2, in order to input, to the fast-transition detector 32, a voltage com generated at a node between the resistors R1 and R2.

Figure 6:
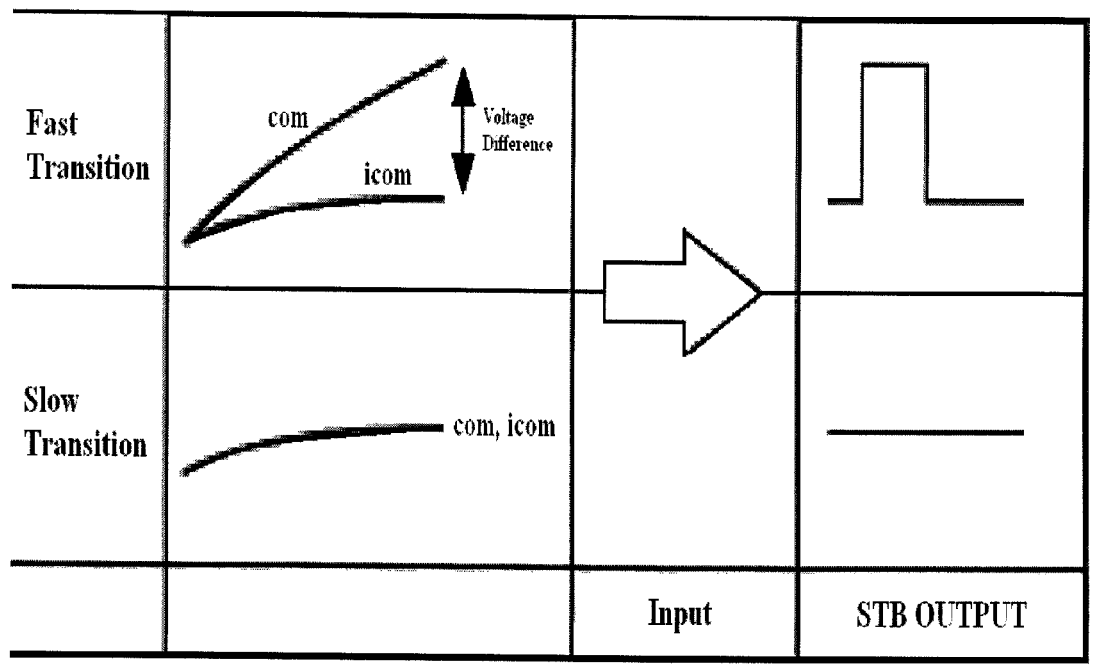
FIG. 6 is a view illustrating an output variation of a fast-transition detector according to embodiments depending on a variation in a voltage com input to the fast-transition detector.

FIG. 6 is a view illustrating an output variation of the fast-transition detector 32 according to a variation in the voltage com input to the fast-transition detector 32. When the voltage com input to the transition detector 32 is varied at a slow transition rate, there is no difference between the voltage com and the voltage icom. In this case, accordingly, the fast-transition detector 32 does not generate a strobe signal STB. However, when the voltage com is varied at a fast transition rate, the voltage icom may not trace the variation of the voltage com. In this case, a voltage difference is generated between the voltage com and the voltage icom. Based on the voltage difference, the fast-transition detector 32 generates a strobe signal STB.

Generation of a clock from the clock reconstitutor 50 can be easily achieved, so long as the strobe signal STB is normally generated. This is because it is recognized, through detection of the strobe signal STB, that a clock signal follows the strobe signal STB.

Thus, in accordance with embodiments, the termination resistor 10 is provided to sense a voltage difference caused by an abrupt variation in paired input signals. Also, the strobe generator 30, which includes the low-frequency filter 31 and the fast-transition detector 32, generates a strobe signal, based on the voltage difference sensed by the termination resistor 10. Subsequently, the clock reconstitutor 50 generates a clock signal in response to the generation of the strobe signal.

Thus, when a strobe signal is extracted, it informs that there is a clock signal at a timing following the extraction of the strobe signal. Accordingly, when the strobe signal is extracted, it is possible to extract the clock signal at a timing following a dummy timing. Also, data following the extracted clock signal can be extracted using a mask signal.

In accordance with embodiments, it is possible to reduce the number of signal lines because a clock is embedded in a data channel. Also, there is no timing margin consumed in the transmitter and cable, as is the case when a separate clock line is used for data transmission.

It will be obvious and apparent to those skilled in the art that various modifications and variations can be made in the embodiments disclosed. Thus, it is intended that the disclosed embodiments cover the obvious and apparent modifications and variations, provided that they are within the scope of the appended claims and their equivalents.

What is claimed is:

1. An apparatus comprising:
    a termination resistor arranged between two input stages, to which a pair of input signals are input, the termination resistor comprising a first resistor and a second resistor;
    a strobe signal generator configured to generate a strobe signal, using a first signal corresponding to a differential voltage output from a node between the first resistor and the second resistor; and
    a clock reconstitutor configured to generate a clock signal in response to the strobe signal generated from the strobe signal generator.

2. The apparatus of claim 1, wherein the strobe signal generator comprises:
- a low-frequency filter configured to filter the first signal, thereby outputting a second signal having a lower voltage level than the first signal; and
- a fast-transition detector configured to receive the first signal and the second signal, thereby generating the strobe signal.

3. The apparatus of claim 2, wherein the fast-transition detector generates the strobe signal when a voltage difference is generated between the first signal and the second signal as the first signal is varied at a transition rate above a predetermined minimum.

4. The apparatus of claim 2, wherein the fast-transition detector does not generate the strobe signal when no voltage difference is generated between the first signal and the second signal as the first signal is varied at a transition rate below a predetermined minimum.

5. The apparatus of claim 1, wherein a receiver sequentially transmits a dummy signal, a strobe signal, a dummy signal, a clock signal, and a data signal, for signal transmission interface.

6. The apparatus of claim 5, wherein the receiver detects the clock signal after extraction of the strobe signal, and detects the data signal after the detection of the clock signal.

7. A method comprising:
- providing a pair of input signals to a termination resistor arranged between two input stages, the termination resistor comprising a first resistor and a second resistor;
- generating a strobe signal using a first signal corresponding to a differential voltage output from a node between the first resistor and the second resistor; and
- generating a reconstituted clock signal in response to the strobe signal.

8. The method of claim 7, generating the strobe signal includes:
- low-frequency filtering the first signal, thereby outputting a second signal having a lower voltage level than the first signal; and
- receiving the first signal and the second signal, wherein generating the strobe signal is based on a transition detection of the first signal and second signal.

9. The method of claim 8, wherein the strobe signal is generated when a voltage difference is generated between the first signal and the second signal as the first signal is varied at a rate above a predetermined minimum.

10. The method of claim 8, wherein strobe signal is not generated when no voltage difference is generated between the first signal and the second signal as the first signal is varied at a transition rate below a predetermined minimum.

11. The method of claim 7, wherein a receiver sequentially transmits a dummy signal, a strobe signal, a dummy signal, a clock signal, and a data signal, for signal transmission interface.

12. The method of claim 11, wherein the receiver detects the clock signal after extraction of the strobe signal, and detects the data signal after the detection of the clock signal.

13. A receiver for clock reconstitution comprising:
- a termination resistor arranged between two input stages, to which a pair of input signals are input, the termination resistor comprising a first resistor and a second resistor;
- a strobe signal generator configured to generate a strobe signal, using a first signal corresponding to a differential voltage output from a node between the first resistor and the second resistor; and
- a clock reconstitutor configured to generate a clock signal in response to the strobe signal generated from the strobe signal generator.

14. The receiver of claim 13, wherein the strobe signal generator comprises:
- a low-frequency filter for filtering the first signal, thereby outputting a second signal having a lower voltage level than the first signal; and
- a fast-transition detector for receiving the first signal and the second signal, thereby generating the strobe signal.

15. The receiver of claim 14, wherein the fast-transition detector generates the strobe signal when a voltage difference is generated between the first signal and the second signal as the first signal is varied at a fast transition rate.

16. The receiver of claim 14, wherein the fast-transition detector does not generate the strobe signal when no voltage difference is generated between the first signal and the second signal as the first signal is varied at a slow transition rate.

17. The receiver of claim 14, wherein the receiver sequentially transmits a dummy signal, a strobe signal, a dummy signal, a clock signal, and a data signal, for signal transmission interface.

18. The receiver of claim 17, wherein the receiver detects the clock signal after extraction of the strobe signal, and detects the data signal after the detection of the clock signal.

19. The receiver of claim 13, wherein the receiver sequentially transmits a dummy signal, a strobe signal, a dummy signal, a clock signal, and a data signal, for signal transmission interface.

20. The receiver of claim 19, wherein the receiver detects the clock signal after extraction of the strobe signal, and detects the data signal after the detection of the clock signal.

* * * * *